(12) United States Patent
Jung

(10) Patent No.: US 10,252,310 B2
(45) Date of Patent: Apr. 9, 2019

(54) TUBE FLANGING METHOD

(71) Applicant: JEJU NATIONAL UNIVERSITY INDUSTRY-ACADEMIC COOPERATION FOUNDATION, Jeju-si, Jeju-do (KR)

(72) Inventor: Dong Won Jung, Jeju-si (KR)

(73) Assignee: JEJU NATIONAL UNIVERSITY INDUSTRY-ACADEMIC COOPERATION FOUNDATION, Jeju-si, Jeju-do (KR)

( * ) Notice: Subject to any disclaimer, the term of this patent is extended or adjusted under 35 U.S.C. 154(b) by 777 days.

(21) Appl. No.: 14/767,292

(22) PCT Filed: Dec. 19, 2013

(86) PCT No.: PCT/KR2013/011850
§ 371 (c)(1),
(2) Date: Aug. 12, 2015

(87) PCT Pub. No.: WO2015/020282
PCT Pub. Date: Feb. 12, 2015

(65) Prior Publication Data
US 2015/0367394 A1    Dec. 24, 2015

(30) Foreign Application Priority Data
Aug. 7, 2013 (KR) ........................ 10-2013-0093627

(51) Int. Cl.
*B21D 19/02*   (2006.01)
*B21D 19/14*   (2006.01)
(Continued)

(52) U.S. Cl.
CPC ............. *B21D 19/02* (2013.01); *B21D 19/14* (2013.01); *B23K 20/122* (2013.01); *F16L 23/00* (2013.01); *B21D 22/14* (2013.01)

(58) Field of Classification Search
CPC ........ B21D 19/02; B21D 19/14; B21D 19/04; B21D 19/046; B21D 22/14; B21D 22/18;
(Continued)

(56) References Cited

U.S. PATENT DOCUMENTS 1,696,229 A * 12/1928 Fantz ..................... B21D 19/02
                                                   29/DIG. 43
1,804,002 A *  5/1931 Fantz ................... B21D 19/046
                                                        72/126
(Continued)

FOREIGN PATENT DOCUMENTS

JP            3199795 A *  8/1991 ............. B21D 19/04
JP            1015674 A *  1/1998 ........... B23K 20/122
(Continued)

OTHER PUBLICATIONS

Machine Translation of JP03-199795, Translated Oct. 17, 2017, 3 pages.*
(Continued)

*Primary Examiner* — Teresa M Ekiert
*Assistant Examiner* — Gregory Swiatocha
(74) *Attorney, Agent, or Firm* — Revolution IP, PLLC

(57) ABSTRACT

A tube flanging method includes the steps of: disposing a tube such that an edge thereof is exposed to the outside of a forming mold while the tube is inserted into the forming mold; applying an external force to the exposed edge of the tube to expand the exposed edge of the tube; applying an external force to the expanded edge to bend the expanded edge toward an outer surface of the forming mold; and applying an external force to the bent edge to form a flange, the flange having a linearly integrated cross section and being perpendicular to the longitudinal direction of the tube. With this configuration, it is possible to bend the tube to form the flange at a uniform thickness.

8 Claims, 5 Drawing Sheets

(51) Int. Cl.
*B21D 22/14* (2006.01)
*B23K 20/12* (2006.01)
*F16L 23/00* (2006.01)

(58) Field of Classification Search
CPC ........ B21D 19/00; B21D 19/08; B21D 19/12; B21D 39/12; B23K 20/122
See application file for complete search history.

(56) References Cited

U.S. PATENT DOCUMENTS

| | | | | |
|---|---|---|---|---|
| 5,622,071 | A | * | 4/1997 | Van Riper ............ B21D 19/046 72/117 |
| 2008/0216539 | A1 | * | 9/2008 | Meinig ................ B21D 19/046 72/86 |
| 2011/0121569 | A1 | | 5/2011 | Hermanson |

FOREIGN PATENT DOCUMENTS

| | | | |
|---|---|---|---|
| JP | 2006-192501 A | | 7/2006 |
| KR | 10-0488485 B1 | | 5/2005 |
| KR | 10-2009-0022459 A | | 3/2009 |
| KR | 10-2010-0132158 A | | 12/2010 |
| KR | 1020100132158 A | * | 12/2010 |
| KR | 1020110050116 A | * | 5/2011 |
| KR | 101251326 B1 | * | 4/2013 |

OTHER PUBLICATIONS

Machine Translation of JP10-015674, Translated Oct. 16, 2017, 3 pages.*
Machine Translation of KR101251326, Translated Oct. 16, 2017, 3 pages.*
Machine Translation of KR20100132158, Translated Oct. 17, 2017, 4 pages.*
Machine Translation of KR20110050116, Translated Oct. 16, 2017, 3 pages.*
International Search Report for PCT/KR2013/011850 dated May 7, 2014 from Korean Intellectual Property Office.

* cited by examiner

-- Prior Art --

-- Prior Art --

[FIG. 2]
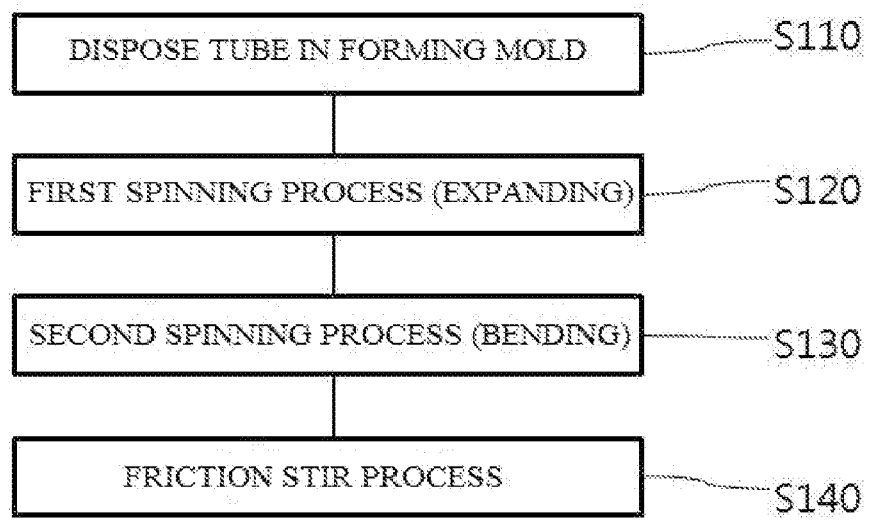

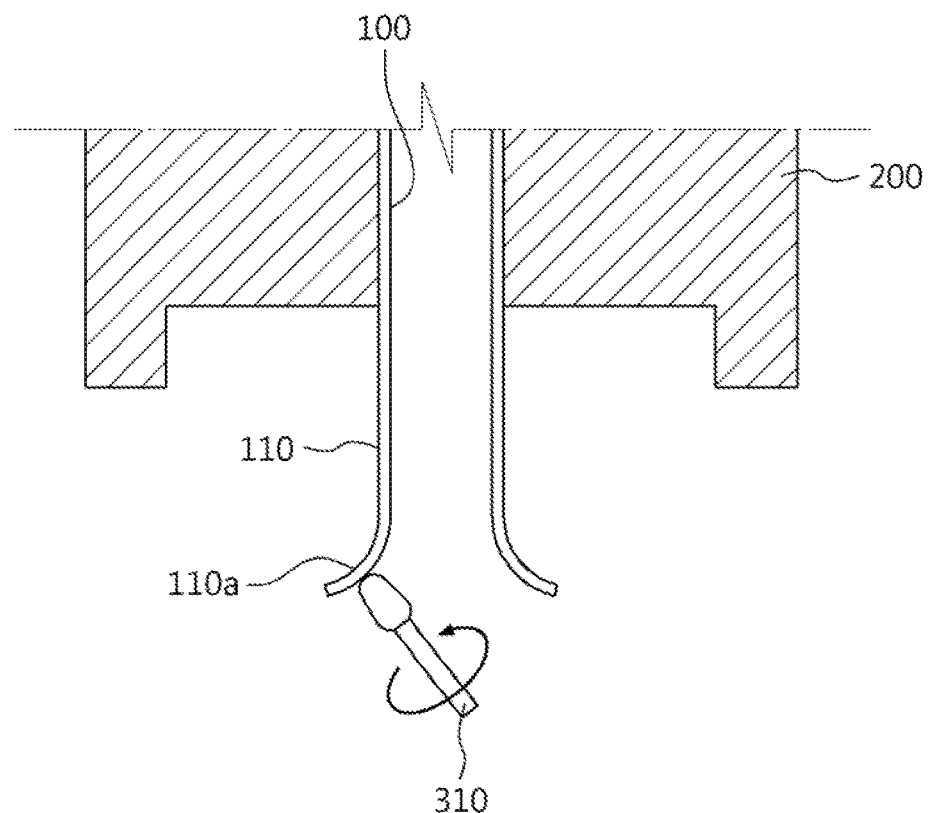
[FIG. 3a]

[FIG. 3b]
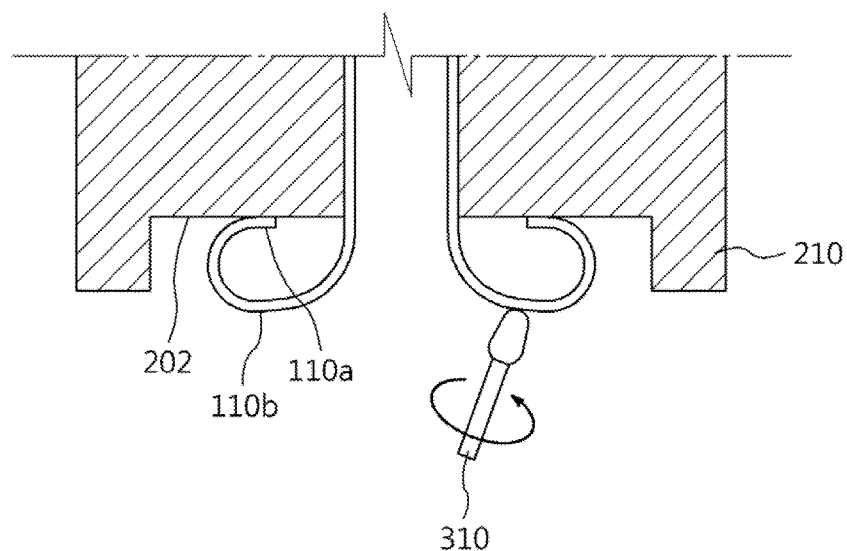
[FIG. 4]
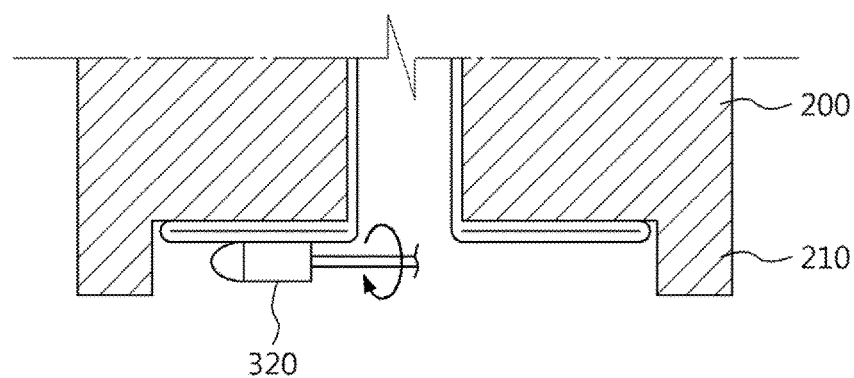

[FIG. 5a]
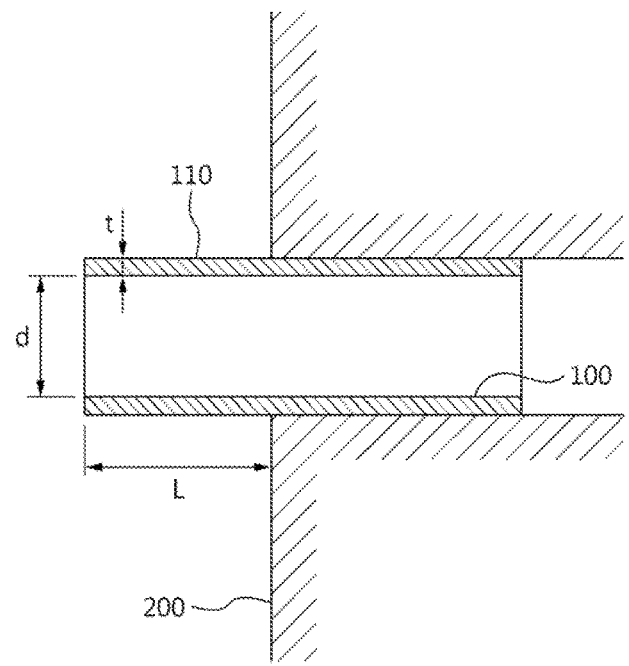
[FIG. 5b]
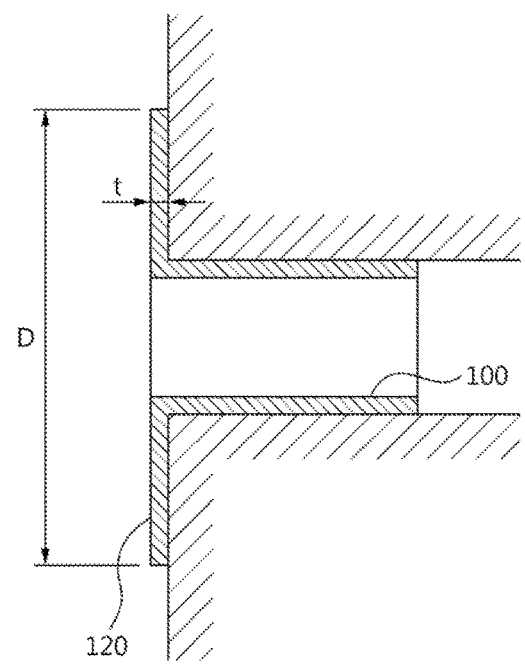

TUBE FLANGING METHOD

CROSS REFERENCE TO PRIOR APPLICATIONS

This application is a National Stage Application of PCT International Patent Application No. PCT/KR2013/011850 filed on Dec. 19, 2013, under 35 U.S.C. § 371, which claims priority to Korean Patent Application No. 10-2013-0093627 filed on Aug. 7, 2013, which are all hereby incorporated by reference in their entirety.

TECHNICAL FIELD

The present invention relates to a tube flanging method, and particularly proposes a new method of directly machining a tube without a cutting or bonding process to manufacture a flange having a constant thickness.

BACKGROUND ART

A flange is a type of fitting, and refers to a pipe joint such as an elbow or a tee which joins pipes. Such a flange may be used when a pipe is coupled to a different mechanical part.

Further, a flange such as a reinforcing flange is also used to increase a strength of a component in addition to when used for connection to the component such as in shaft coupling or pipe coupling.

Refrigerant pipes are connected to constituent elements such as a compressor, a condenser, an expansion valve, and an evaporator constituting a refrigeration cycle of an air conditioner such that a fluid can flow continuously. To improve a coupling force between the refrigerant pipe and the constituent element, a flange is fastened to ends of the refrigerant pipe. The flange for coupling the pipe is typically formed of plastic by injection molding. Since the plastic is relatively easily processed, the flange can be manufactured to exact dimensions including a thickness.

Meanwhile, for the purpose of the connection between the pipes as well as the reinforcement of the connection strength, a flange formed of a metal material such as stainless steel is required. As shown in FIG. 1a, a flange 10 generally includes a pipe portion 12 acting as a flange body, and an edge portion 14 having a disc shape. The pipe portion and the edge portion may be separately prepared and bonded by, for instance, welding. Otherwise, one pipe body may be partly cut and machined into a flange form. In the case of the cutting method, a flange can be machined to precise dimensions, but a waste of material is severe. When the flange is formed by welding, a fusion zone may be weak in strength.

To process the flange having precise dimensions, various methods can be used. For example, as shown in FIG. 1b, an edge 20b of a structure 20a having a pipe form may be first partly bent and machined into a form of a flange 22.

In the event of the machining based on the bending method, there is a problem that a thickness t1 of the pipe prior to the bending is different from a thickness t2 of the flange formed by bending.

Therefore, it is necessary to develop a new flanging method capable of maintaining process efficiency and a strength of a finally machined product while maintaining a uniform thickness.

DISCLOSURE

Technical Problem

Accordingly, the present invention has been made in an effort to solve the problems occurring in the related art, and an object of the present invention is to provide a new method capable of bending a pipe to form a flange while maintaining a uniform thickness.

Another object of the present invention is to provide a flanging method that facilitates mass production and provides excellent process efficiency and a high degree of freedom of design.

Still another object of the present invention is to provide process conditions for a flanging process based on a bending method and a mold suitable for the process conditions.

Other objects and technical features of the present invention will be more specifically presented in the detailed description below.

Technical Solution

In order to achieve the above objects, according to one aspect of the present invention, there is provided a tube flanging method, which includes: disposing a tube such that an edge thereof is exposed to the outside of a forming mold while the tube is inserted into the forming mold; applying an external force to the exposed edge of the tube to expand the exposed edge of the tube; applying an external force to the expanded edge to bend the expanded edge toward an outer surface of the forming mold; and applying an external force to the bent edge to form a flange, the flange having a linearly integrated cross section and being perpendicular to a longitudinal direction of the tube.

Here, the edge may be expanded and bent by a spinning process. The bent edge may be formed into the flange having the linearly integrated cross section by a friction stir process.

Further, when the edge is expanded and bent or when the flange is formed, the forming mold or the tube may be rotated.

Also, in the tube flanging method according to the present invention, when an inner diameter of the tube is defined as d, and when a diameter of the flange is defined as D, a length (L) of the edge of the tube which is exposed to the outside of the forming mold may be determined as $L=(0.25)(D^2-d^2)/(d+t)$.

According to another aspect of the present invention, there is provided a bent flange that includes a bent edge of a tube, and a flange in which the bent edge has a linearly integrated cross section and which is formed in a direction perpendicular to a longitudinal direction of the tube, wherein a thickness of the flange is the same as that of the tube.

According to yet another aspect of the present invention, there is provided a forming mold for tube flanging, which includes: a tube seating hole into which a tube is inserted and fixed; a circular processing face that exposes a portion of the tube to bend the exposed portion and is provided around the seating hole; and a restriction mold that restricts a processing length of the tube to within an outer circumference of the processing face.

Here, when an inner diameter of the tube is defined as d and a length of the exposed portion is defined as L, an inner diameter (D) of the restriction mold may be determined as $$D=\sqrt{4dL+d^2}.$$

Further, the forming mold is preferably rotatable, and the restriction mold may be detachable from the forming mold and may include various molds having different inner diameters.

Advantageous Effects

According to the present invention, the flange can be formed by bending the tube while maintaining a uniform thickness.

Especially, process conditions for flange processing based on a bending process and a mold suitable for them are provided. Thereby, in the event of the flange processing, reproducibility is excellent, process efficiency is high, and a degree of freedom of design is high.

Therefore, mass production of various high-quality flange products is possible according to the present invention.

DESCRIPTION OF DRAWINGS

FIG. 2 is a flowchart showing processes of a tube flanging method according to the present invention.

FIGS. 3a and 3b are schematic views showing a process of bending a tube using a spinning process.

FIG. 4 is a schematic view showing a process of forming a flange using a friction stir process.

FIGS. 5a and 5b are schematic views showing process conditions for flange processing.

MODE FOR INVENTION

Figure 1A:
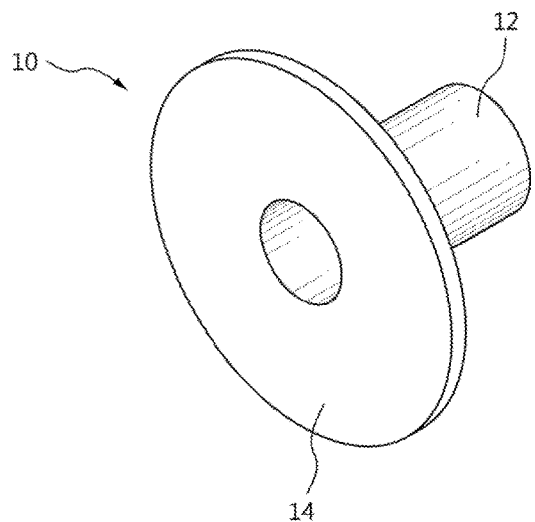
FIGS. 1a and 1b are view for describing a flange structure and flange processing based on a bending process.
Figure 1B:
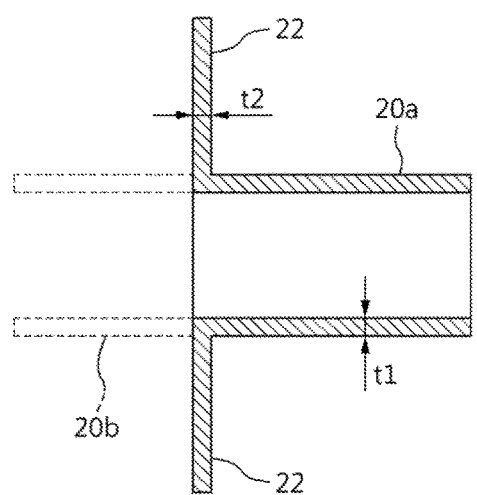

The present invention is directed to a tube flanging technique, and proposes a method in which, in expanding an edge of a tube to form a flange, the edge (i.e. portion to be flanged) of the tube exposed to the outside of a forming mold is expanded under an external force using a spinning tool or the like, subsequent processing proceeds such that the expanded edge is rolled inward, the rolled edge is linearly integrated by friction stirring to form a flange bent at right angles such that an original thickness of the tube and a thickness of the flange are maintained constant.

Particularly, in the present invention, when the flange is formed by bending, process conditions having excellent reproducibility are presented. Thereby, it is possible to make the thickness of the flange identical to the original thickness of the tube. For example, in the tube for flanging, the length exposed to the outside of the forming mold may be specified to adjust a size of the forming mold, or a length of the exposed portion of the tube may be adjusted when the forming mold is determined on a predetermined scale Hereinafter, technical configurations and effects of the present invention will be described in greater detail using an exemplary embodiment of the invention with reference to the drawings.

FIG. 2 shows processes for a tube flanging method according to the present invention. First, a tube is placed in a forming mold (S110).

As shown in a sectional schematic view of FIG. 3a, the forming mold 200 is formed with a cylindrical seating hole into which the tube 100 can be inserted and fixed. Further, a portion of the tube is exposed, and then the exposed portion is bent. To this end, a circular processing face 202 (FIG. 3b) is provided around the seating hole. In addition, the forming mold is preferably provided with a restriction mold 210 (FIG. 4) that restricts a processing length of the tube to within an outer circumference of the processing face.

An edge of the tube (FIG. 3a) is exposed to the outside of the forming mold when the tube is inserted into the forming mold.

An external force is applied to the exposed edge of the tube, thereby expanding the edge as shown in FIG. 3a. Due to the expansion, a first bend 110a is formed at the edge. The expanding process may be performed using a bending tool 310, for instance, in a spinning process (first spinning process, S120).

Next, an external force is applied to the edge in a step-by-step way or in a continuous way after the expansion, thereby bending the edge toward an outer face of the forming mold. In this process, a second bend 110b is formed at the edge. The second bend 110b is bent toward the processing face 202 of the forming mold, and the edge is in a rolled state like a spherical shape on the whole. In this state, the first bend 110a and the second bend 110b face each other.

Like the aforementioned expanding process, this bending process may also be performed using the bending tool 310 in the spinning process (second spinning process, S130).

An external force is applied to the bent edge using a pressing tool 320, thereby forming a flange that has a linearly integrated cross section and is perpendicular to a longitudinal direction of the tube, as shown in FIG. 4.

The bent edge may be formed into the flange having the linearly integrated cross section by a friction stir process (friction stir process, S140).

The friction stir process is a simple unique continuous process in which substrates to be joined are fixed, a portion of a non-consumable rotating tool harder than the substrates is inserted along a butt joint, and a frictional heat is generated by relative movement between the tool and the substrates and reduces resistance to deformation of the substrates to heat the joint adjacent to the tool. Thus, a softened zone is generated around a probe that is the inserted portion of the tool. As the probe moves along a joint line under a mechanical force, the heated zone is extruded backward in front of the probe. A solid state joint is made by a combination of the frictional heat and the mechanical processing.

In the present invention, the bent edge is linearly processed using this friction stir process, and the first bend 110a and the second bend 110b are integrated to improve a strength using friction stir welding, forming the flange perpendicular to the longitudinal direction of the tube. The thickness of the flange is identical to the original thickness of the tube due to the friction stir process, and an increase in horizontal length, i.e. diameter, of the flange is restricted by the restriction mold 210 at the outer circumference of the processing face of the forming mold.

In the present invention, when the edge is expanded and bent or when the flange is formed, the forming mold or the tube can be rotated. In this way, by rotating the tube itself or the forming mold (along with the tube), it is possible to increase process efficiency of the spinning process and the friction stir process and uniformly form a shape of the processed flange, and it is easy to control the thickness of the flange.

Further, in the present invention, the process conditions for the bent flange can be controlled such that the thickness of the flange is identical to that of the tube.

Referring to FIG. 5a, in the forming mold 200 for the tube flanging according to the present invention, the tube 100 is inserted into and fixed in the seating hole, and in this state, a portion 110 of the tube is exposed. When the inner diameter of the tube is defined as d, the thickness of the tube is defined as t, and the length of the edge of the tube which is exposed to the outside of the forming mold is defined as L, a volume $V_E$ of the exposed tube is as follows.

$$V_E = \pi L t (d+t)$$

Also, referring to FIG. 5b, the flange 10 is formed by the tube flanging. When the inner diameter of the tube is defined as d, the diameter of the flange is defined as D, and the thickness of the flange is defined as t that is the same as the tube, a volume $V_E$ of the flanged end is as follows.

$$V_E=(0.25)\pi(D^2-d^2)(t)$$

In the tube flanging according to the present invention, when the inner diameter of the tube is defined as d and the diameter of the flange is defined as D, the length L of the edge of the tube exposed to the outside of the forming mold is determined from such a relation as follows.

$$L=(0.25)(D^2-d^2)/(d+t)$$

That is, if the size of the forming mold is constant, the thickness of the flange which is identical to the original thickness of the tube can be obtained by restricting the length of the edge which is exposed to the outside of the forming mold.

Further, when the inner diameter of the tube is defined as d and the length of the exposed edge is defined as L, the inner diameter D of the restriction mold can be determined as follows.

$$D=\sqrt{4L(d+t)+d^2}$$

That is, even if the length of the edge exposed to the outside is changed, the flange having the same thickness as the tube can be formed by a change in the inner diameter of the restriction mold provided for the forming mold.

In the present invention, the forming mold and the restriction mold are preferably rotatable, and the restriction mold is preferably detachable from the forming mold in order to use various molds having different inner diameters.

In the above description, the embodiment of the present invention has been disclosed for illustrative purposes, the present invention is not limited to these specific embodiments. It is apparent to those skilled in the art that a variety of modifications and changes may be made without departing from the scope of the present invention which is intended to be defined by the appended claims.

LIST OF SYMBOLS OR NUMERALS

100: pipe
110: edge
110a, 110b: bend
120: flange
200: forming mold
202: processing face
210: restriction mold
310: bending tool
320: pressing tool

The invention claimed is:

1. A tube flanging method comprising:
   disposing a tube such that an edge thereof is exposed to an outside of a forming mold while the tube is inserted into the forming mold;
   expanding the exposed edge of the tube to have a first bend with a spinning tool;
   bending the expanded edge of the tube to have a second bend by the spinning tool, the second bend being bent toward an outer surface of the forming mold,
   wherein the first bend and the second bend face each other; and
   forming a flange by friction stir welding the first and the second bends, wherein the flange is flat and perpendicular to a longitudinal direction of the tube,
   wherein a thickness of the flange formed by the friction stir welding is the same as a thickness of the tube.

2. The tube flanging method according to claim 1, wherein the first bend and the second bend are integrated by the friction stir welding.

3. The tube flanging method according to claim 2, wherein, when the edge is expanded and bent or when the flange is formed, the forming mold or the tube is rotated.

4. The tube flanging method according to claim 1, wherein a length (L) of the edge of the tube which is exposed to the outside of the forming mold is expressed as $L=(0.25d)(D^2-d^2)/(d+t)$, wherein an inner diameter of the tube is d, a diameter of the flange is D, and a thickness of the tube is defined as t.

5. The tube flanging method according to claim 1, wherein the forming mold comprises:
   a tube seating hole into which the tube is inserted and fixed;
   a circular processing face that exposes the edge of the tube to bend the exposed portion and is provided around the seating hole; and
   a restriction mold that restricts a processing length of the tube to within an outer circumference of the processing face.

6. The tube flanging method according to claim 5, wherein, when an inner diameter of the tube is defined as d, a length of the exposed portion is defined as L, a thickness of the tube is defined as t, and an inner diameter (D) of the restriction mold is expressed as $D=\sqrt{4L(d+t)+d^2}$.

7. The tube flanging method according to claim 5, wherein the forming mold is rotatable.

8. The tube flanging method according to claim 5, wherein the restriction mold is detachable from the forming mold.

* * * * *